United States Patent [19]
Hall et al.

[11] 4,361,296
[45] Nov. 30, 1982

[54] UNIFLANGE COUPLING ASSEMBLY

[75] Inventors: Leslie G. Hall, Bellevue; David V. Larson, Mercer Island; Michael A. Smith, Tacoma; Stuart K. Wood, Seattle, all of Wash.

[73] Assignee: The Boeing Company, Seattle, Wash.

[21] Appl. No.: 128,515

[22] Filed: Mar. 10, 1980

[51] Int. Cl.³ .............................................. B64D 27/00
[52] U.S. Cl. ................................... 244/54; 60/39.31; 60/226 R; 248/557
[58] Field of Search ...................... 244/54, 53 R, 53 B, 244/207, 129.3; 248/554, 557, 631; 60/39.31, 39.32, 226 R; 285/97; 403/5, 338, 335

[56] References Cited
U.S. PATENT DOCUMENTS

| | | | |
|---|---|---|---|
| 3,191,240 | 6/1965 | Slaman et al. | 244/129.3 X |
| 3,236,544 | 2/1966 | Brown | 285/97 |
| 3,455,073 | 7/1969 | Kiekhaefer | 52/200 |
| 3,960,343 | 6/1976 | Thompson et al. | 244/207 X |
| 4,037,809 | 7/1977 | Legrand | 60/226 R X |

Primary Examiner—Sherman D. Basinger
Attorney, Agent, or Firm—Christensen, O'Connor, Johnson & Kindness

[57] ABSTRACT

The inlet of a turbofan jet propulsion engine is coupled to the engine fan casing via a unique uniflange coupling assembly. One of the inlet and casing components carries a radial flange while the other of the components carries a pair of radial flanges each spaced on opposite sides of the flange carried by the first component. A pair of toroidally shaped members are positioned respectively between the two pairs of spaced opposing abutment surfaces thus formed by the three flanges. Preferably the members are hollow, have flexible but substantially inelastic walls, and are filled with a fluid. These members allow the two components to angulate relative to each other while allowing loads to be transferred from the first component to the second component only in an axial direction. Other loads are transferred to the engine mounting structure through other linkage.

8 Claims, 5 Drawing Figures

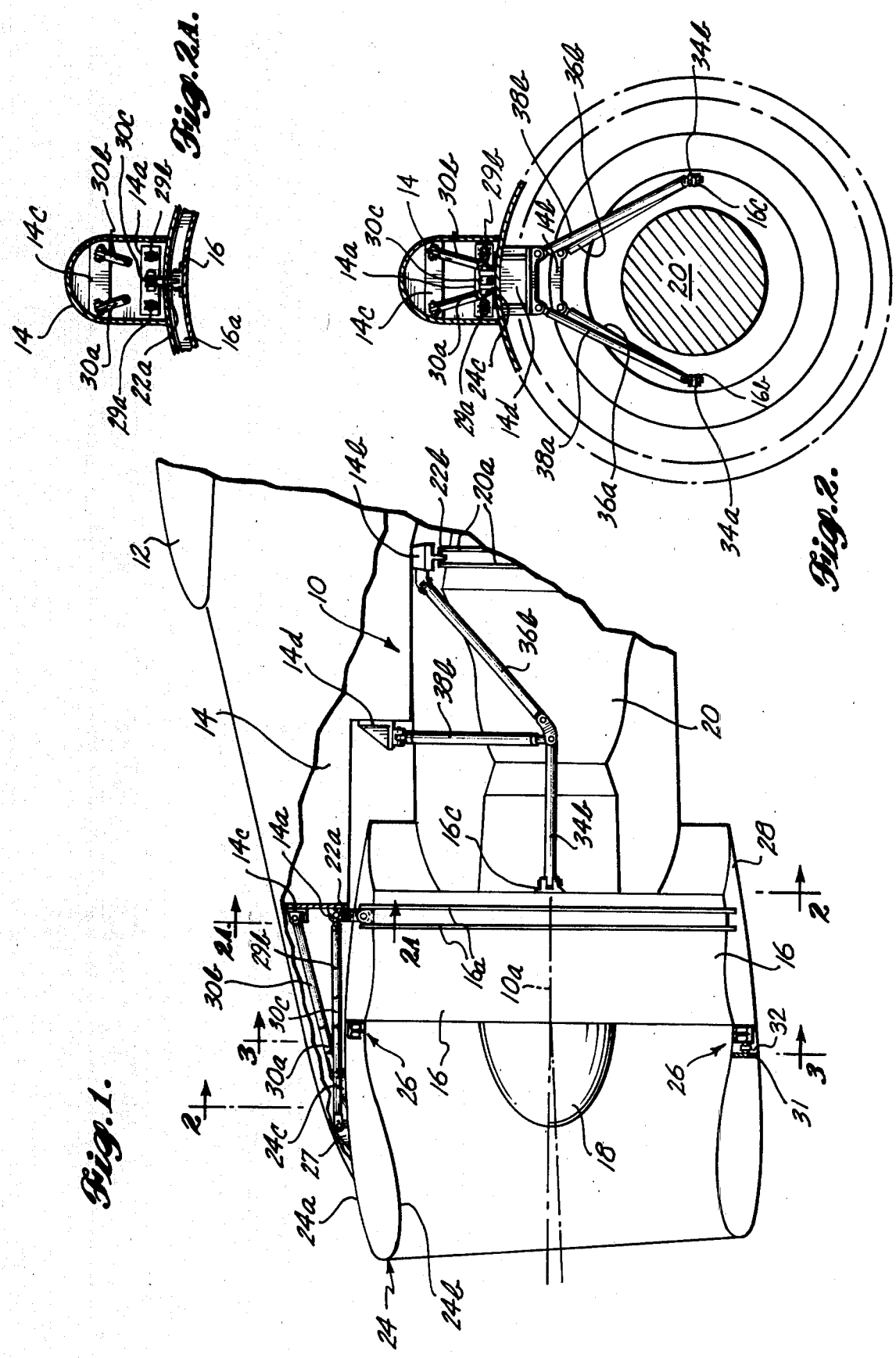

UNIFLANGE COUPLING ASSEMBLY

BACKGROUND OF THE INVENTION

The present invention relates to an assembly for interconnecting two annularly shaped components and more particularly to an assembly for coupling annularly shaped jet propulsion engine components to each other so that loads are transmitted only in an axial direction from one member to the other.

In the past, many components of a cylindrical or annular shape have been attached to aircraft jet propulsion engines by conventional, rigid radial flange connections. For example, the fan inlet cowling is attached to the fan casing in a conventional manner by radial flanges that have mutually opposing abutment surfaces. These radial flanges are removably interconnected by threaded or other conventional fasteners.

The advent of high bypass turbofan jet propulsion jet engines has resulted in problems arising from the interconnection of components such as fan inlet cowlings to the fan casings in the conventional manner. The dynamic forces exerted on a fan inlet, for example upon takeoff, result in a bending moment being transferred through the flange interconnections from the inlet to the fan casing. The bending moments cause distortions in the fan casing, which can cause the fan casing to contact the fan blades, resulting in excess blade and tip seal wear, loss of engine performance, and increased fuel consumption.

It is, therefore, an object of the present invention to reduce the blade and tip seal wear, to increase performance of turbofan jet propulsion engines upon takeoff and cruise, and to decrease fuel consumption. More particularly, it is an object of the present invention to prevent bending moments from being transferred from a fan inlet of a jet propulsion engine to the fan casing and thus to eliminate distortions in the fan casing. In a broader sense, it is an object of the present invention to create a flange coupling assembly for two annular or cylindrical aircraft components that will transfer only axial loads between the members while allowing one of the annular members, for example a fan inlet, to move angularly relative to the other of the annular members, for example a fan casing.

SUMMARY OF THE INVENTION

The foregoing objects and other objects that will become apparent to one of ordinary skill upon reading the following specification are realized in a method and apparatus for securing a first annular aircraft component to a second annular aircraft component, wherein one of the components is a fan inlet duct for a jet propulsion engine and the other component is a fan casing on the engine. The first component is provided with a pair of spaced abutment members having annular, spaced, mutually opposing abutment surfaces thereon. The second component is provided with a second abutment member having oppositely facing abutment surfaces. The second component abutment member is sized and proportioned to reside in spaced relationship between the pair of flanges on the first component so that each abutment surface on the second component abutment member opposes and is spaced from a respective mutually opposing abutment surface on the pair of abutment members. The arrangement of the first and second components thereby forms first and second sets of annularly shaped mutually opposing abutment surfaces. First and second toroidally shaped, fluid-filled members are positioned in contact respectively with said first and second sets of mutually opposing abutment surfaces. The fluid-filled members are incapable of transferring a bending moment across the interconnection. Thus, only axial forces can be transmitted between the two components through the fluid-filled members.

BRIEF DESCRIPTION OF THE DRAWINGS

A better understanding of the present invention can be derived by reading the ensuing specification in conjunction with the accompanying drawings wherein:

FIG. 1 is a longitudinal sectional view of a high bypass, turbofan jet propulsion engine coupled to an underslung wing strut showing the uniflange coupling assembly of the present invention interconnecting the fan inlet and casing;

FIG. 2 is a cross-sectional view of the engine of FIG. 1 taken along section line 2—2 showing the thrust linkage for transferring axial loads from the fan case to the engine mounting strut and the links for coupling radial and transverse loads from the inlet to the strut;

FIG. 2A is a cross-sectional view taken along section line 2A—2A of FIG. 1 of a portion of the linkage coupling the inlet to the strut as well as the hanger for vertically suspending the engine from the strut;

DETAILED DESCRIPTION OF THE DRAWINGS

Figure 3:
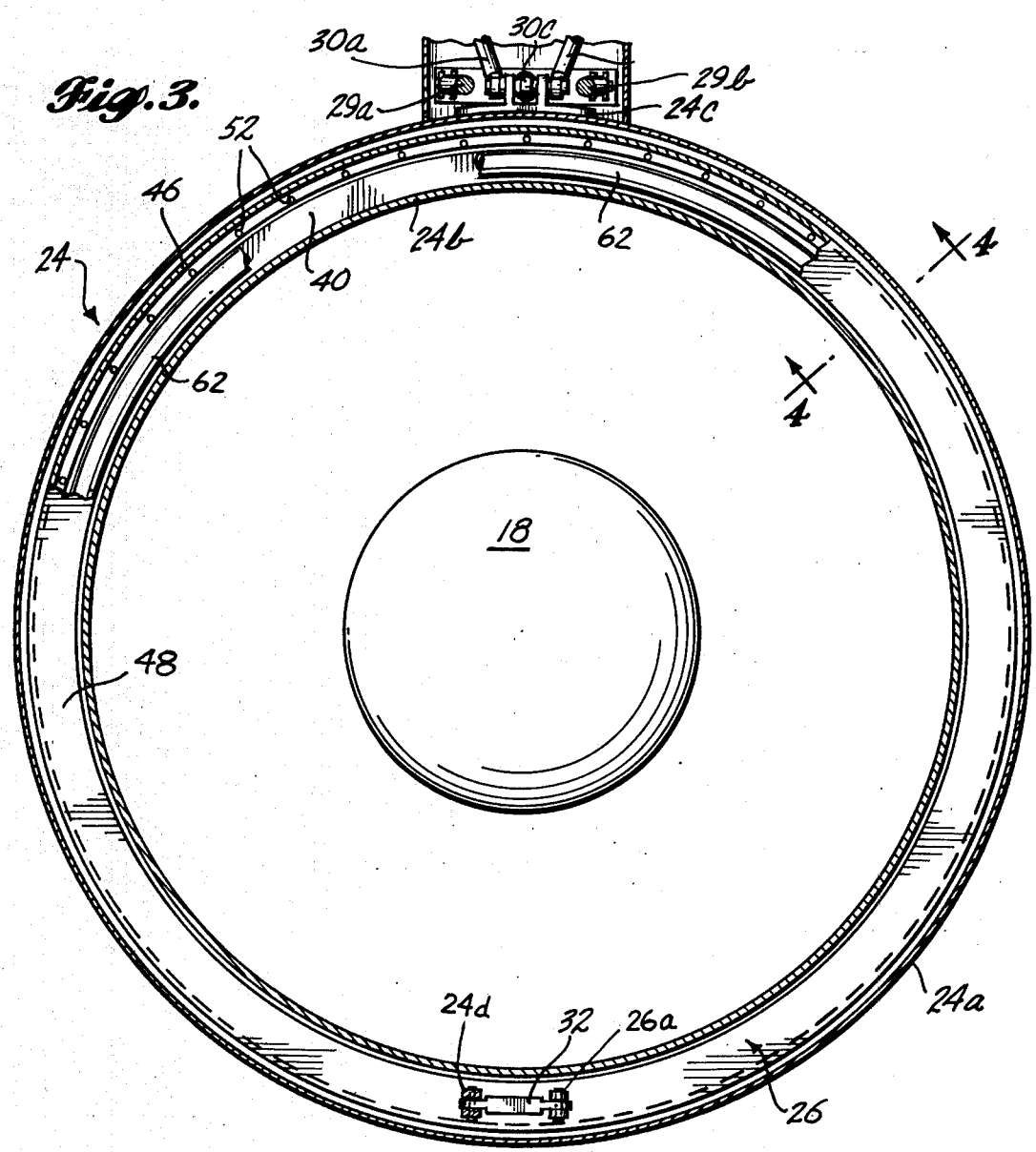
FIG. 3 is an enlarged cross-sectional view of the engine and the uniflange coupling assembly of the present invention taken along section line 3—3 of FIG. 1 showing the sway bar linkage between the inlet and the fan case.

Referring first to FIG. 1, a turbofan jet propulsion engine 10 is mounted under an aircraft wing 12 from a downwardly and forwardly extending engine mounting strut 14. The strut 14 is affixed to the aircraft wing in a conventional manner. The high bypass turbofan engine includes a fan surrounded by a fan casing 16, an inlet plug 18, and a core assembly 20. The rearward portion of the engine 10 including the exhaust nozzle and the nozzle plug have been omitted from the view. The turbofan engine 10 is suspended from the strut 14 by conventional hangers 22a and 22b. Hanger 22a is pinned to a flange 14a on the forward end of strut 14 and extends downwardly and is pinned to radially extending fan case flanges 16a. (See also FIG. 2A.) Hanger 22b is similarly pinned to flange 14b toward the rearward end of strut 14 and extends downwardly and is pinned to radially extending flanges 20a on the upper, rearward portion of the engine core 20. Neither of the hangers 22a or 22b is intended to transfer axial loads from the engine to the strut. The fan casing 16 is preceded by an inlet 24 including an outer cowl 24a and an inlet duct wall 24b. The inlet 24 is coupled to the fan casing by the uniflange coupling assembly 26 of the present invention. As will be understood in more detail after reading the ensuing portions of the specification, the uniflange coupling assembly 26 transmits only axial loads rather than transverse or bending moments from the inlet 24 to the fan casing 16. The fan duct cowling 28 can be attached to the fan case in a conventional manner.

Referring to FIGS. 1, 2, and 2A the inlet 24 is suspended from the strut 14 by a tetrahedral linkage 30 consisting of links 30a, 30b, and 30c and a two-bar linkage 29 consisting of links 29a and 29b. The forward ends of links 30a, b, and c are pinned to a flange 24c extending upwardly from the rearward, upper portion of the inlet 24. The lower forward end of link 30b is broken away to expose the forward ends of the other two links 30a and 30c. Link 30c extends horizontally rearwardly from flange 24c and is pinned to the strut flange 14a along with the fan case hanger 22a. Links 30a and b extend rearwardly and upwardly from flange 24c, and diverge from each other in a rearward direction. Links 30a and 30b are pinned to flange 14c, which is positioned on the strut 14 at a location above flange 14a. The forward ends of links 29a and 29b are pinned to a flange 27 affixed to and extending upwardly from the upper portion of the inlet 24. Flange 27 is located forwardly from flange 24c. The two links 29a and 29b diverge rearwardly and horizontally from the flange 27 toward the forward end of the strut 14 and are pinned to flanges extending forwardly from the strut 14 on opposite sides of the strut flange 14a. The central portion of link 29b is broken away in FIG. 1 so that the forward portion of the tetrahedral linkage 30 is exposed in that view. The two-bar linkage 29 and the tetrahedral linkage 30 thus form a three-dimensional trusswork that not only suspends the inlet 24 from the strut 14, but also transfers radial and transverse loads (relative to the engine centerline) from the inlet to the strut.

Referring to FIGS. 1 and 3, the bottom portion of the inlet 24 is coupled to a portion of the uniflange assembly 26 that is rigidly affixed to the fan case 16 by a sway bar 32. The sway bar 32 is pinned to a flange 26a extending forwardly from the forward portion of the uniflange assembly 26. The sway bar extends from flange 26a transversely (essentially tangentially) across the bottom center of the inlet 24 and is pinned to a second flange 24d affixed to the bottom portion of the inlet. The sway bar 32 and flanges 26a and 24d are designed to transfer transverse or torsional loads from the inlet to the fan casing, but not axial loads.

Referring again to FIGS. 1 and 2, the thrust linkage system, including links 34a and b, 36a and b, and 38a and b, is provided to transfer axial loads from the fan casing 16 and thus the entire engine to the strut 14 without exerting any bending moments on the fan casing or engine core. Flanges 16b and 16c are affixed to and extend rearwardly from the right and left sides of the fan casing 16. The right and left horizontal links 34a and 34b are pinned to the flanges 16b and 16c and extend rearwardly from the fan case in parallel relationship along a horizontal plane that passes through the engine centerline 10a. The rearward ends of the horizontal links 34a and b are located at about the midpoint of the engine casing. The lower ends of the transfer links 36a and b are pinned to the rearward end of the horizontal links 34a and b respectively and converge toward each other in an upward, rearward direction and toward the strut 14 where the upper ends of links 36a and b are pinned to strut flange 14b. The lower ends of transfer links 38a and b are also pinned to the rearward ends of horizontal links 34a and b respectively and extend upwardly toward the strut while converging toward each other. The upper ends of links 38a and b are pinned to strut flange 14d, which is located above the engine 10 approximately midway between the strut flanges 14a and 14b. Thus, by utilizing the hangers 22a and 22b, which do not transfer axial loads, and the thrust linkage just described, all axial loading on the fan casing 16 and engine core 20 are transferred only in an axial direction via the thrust linkage system. Moreover, since any loads on the inlet are transferred to the fan casing only in an axial direction through the uniflange assembly, and since the load on the fan casing is transferred in an axial direction to the strut 14, no substantial bending moments are applied to the fan casing. As a consequence, the warping of the fan casing is substantially reduced, extending fan blade tip wear well beyond the limits encountered with conventional connecting and mounting structures.

Figure 4:
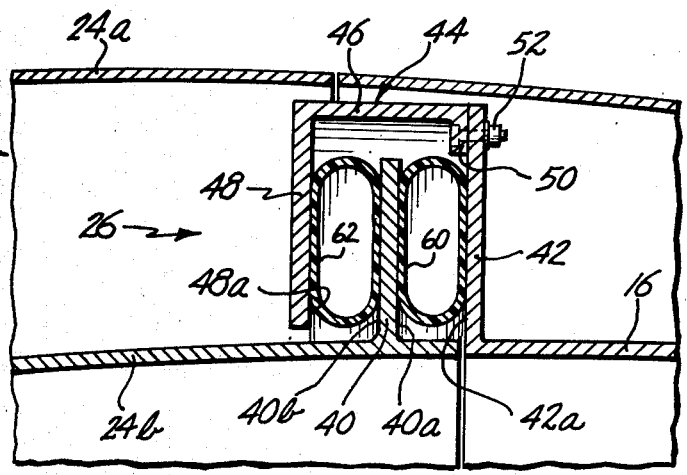
FIG. 4 is a greatly enlarged sectional view of the uniflange coupling assembly taken along the section line similar to 4—4 of FIG. 2.

Referring now to FIGS. 3 and 4, the uniflange assembly includes a radially outwardly extending inlet flange 40 formed integrally with the rearward end of the inlet duct wall 24b. The inlet flange 40 is annularly shaped and has a relatively thin cross section. The outer periphery of the flange 40 terminates internally of the radial position of the fan case cowl and the inlet cowl 24a. An annular flange 42 is similarly formed integrally with and extends radially outwardly from the forward edge of the fan case 16. The outer periphery of the flange 42 terminates radially outwardly from the inlet flange 40, but inwardly from the fan case cowl. The forward face of the fan case flange 42 and the rearward face of the inlet flange 40 form a first pair of opposing, generally parallel abutment surfaces 40a and 42a.

An annular bracket 44 having a generally L-shaped cross section is comprised of a web 46, a forward radially oriented flange 48 and rearward connecting flange or lip 50. The upper portion of the flange 48 is broken away in FIG. 3 to expose the elements of the uniflange assembly behind it. The L-shaped bracket 44 generally surrounds the aft portion of the inlet duct wall 24b, with the radially oriented flange 48 positioned forwardly of the inlet flange 40 and the short connecting flange abutting the forward peripheral portion of the fan case flange 42. Suitable fasteners 52 extending through appropriately aligned holes rigidly interconnect the rearward flange 50 to the fan case flange 42. The inner circumference of the forward flange 48 is spaced a small distance outwardly from the outer surface of the inlet duct wall 24b. The web 46 has a sufficient width to space the forward flange 48 forwardly from the inlet flange 40. Thus, the forward facing surface 40b of the inlet flange and the rearwardly facing surface 48a of the bracket flange 48 form a second pair of mutually opposing, spaced abutment surfaces.

In accordance with the present invention, the fan case flange 42 and L-shaped bracket are coupled to the inlet flange 40 by a pair of toroidally shaped members 60 and 62. the first toroidally shaped member 60 is positioned between the first of abutment faces 40a and 42a. The second toroidally shaped resilient member 62 is positioned between the second pair of annular abutment faces 40b and 48a. The members 60 and 62 are preferably hollow, toroidally shaped members that are filled with either a compressible or incompressible fluid. Most preferably, the walls of the members are composed of a material that is flexible and substantially inelastic and that has a very high tensile strength, for example a fiber-reinforced elastomeric material. Most preferably, members 60 and 62 are filled with a compressed gas, which renders it possible to vary the stiffness of the connection by varying the gas pressure.

The uniflange assembly is thus constructed to allow the inlet to angulate slightly about the engine axis when bending moments are applied to the inlet. Because the uniflange assembly is angularly flexible and axially stiff, the bending moments are not transferred to the fan casing. Instead only axial components of the loads are transferred through the uniflange assembly to the fan casing. The transverse or radial loading on the inlet is instead transferred through the triangular linkage 29 and the tetrahedral linkage 30 directly to the strut. Since the axial loading on the fan casing is transferred to the strut in an axial direction, no substantial bending moments are applied to the fan casing, thus virtually eliminating distortion of the fan casing and consequent blade tip and seal wear. Thus, the uniflange coupling assembly of the present invention fulfills the objects set forth above. In addition, it will be recognized that the uniflange coupling assembly can perform the second function of cushioning the transfer of a sudden, large transitory force that could be exerted on the inlet flange through the fan casing.

In summary, the present invention has been described in relation to a preferred embodiment of the invention. Although only the uniflange coupling assembly associated with the inlet and fan casing has been described, it is to be understood that uniflange assembly could be associated with other annular engine parts as well as other aircraft and nonaircraft structures. In addition, it is to be realized that one of ordinary skill after reading the foregoing specification could make various alterations, substitutions of equivalents and other changes without departing from the general concepts disclosed herein. It is therefore intended that the scope of the Letters Patent granted hereon be limited only by the definition contained in the appended claims and equivalents thereof.

The embodiments of the invention in which an exclusive property or privilege is claimed are as follows:

1. An apparatus for securing a first annular aircraft component to a second annular aircraft component, wherein one of said first and second components is a fan inlet duct for a jet propulsion engine and wherein the other of the said first and second components is a fan casing on a jet propulsion engine, the apparatus comprising:

a pair of spaced abutment members having annular, mutually opposing abutment surfaces thereon, said mutually opposing abutment surfaces being perpendicular to a longitudinal axis through the center of said annular components, said mutually opposing abutment surfaces being spaced along said longitudinal axis, said pair of abutment members being associated with said first aircraft component, a second component abutment member associated with said second aircraft component, said second component abutment member having oppositely facing abutment surfaces, said oppositely facing abutment surfaces being perpendicular to said longitudinal axis, said second component abutment member being sized and proportioned to reside in spaced relationship between said pair of abutment members so that each abutment surface on said second component abutment member opposes and is spaced from a respective one of the mutually opposing abutment surfaces on said pair of abutment members, thereby forming first and second sets of annularly shaped, mutually opposing surfaces perpendicular to said longitudinal axis; and first and second toroidally shaped, flexible, substantially inelastic members positioned in contact only with said first and said second sets of mutually opposing surfaces respectively.

2. The apparatus of claim 1 wherein said first and second toroidally shaped members are hollow and filled with a fluid.

3. The apparatus of claim 2 wherein said fluid comprises a compressible fluid.

4. The apparatus of claim 2 wherein said fluid comprises an incompressible fluid.

5. A method for securing a first annular aircraft component to a second annular aircraft component, wherein one of said first and second components is a fan inlet duct for a jet propulsion engine and wherein the other of said first and second components is a fan casing on a jet propulsion engine, comprising the steps of:

affixing to said first component, a pair of abutment members having annular, mutually opposing abutment surfaces thereon, said mutually opposing abutment surfaces being spaced along a longitudinal axis through the center of said annular components;

affixing to said second component, a second component abutment member having oppositely facing abutment surfaces thereon;

positioning said second component abutment member in spaced relationship between said pair of abutment members so that each abutment surface on said second component abutment member opposes and is spaced from a respective, mutually opposing abutment surface on said pair of abutment members, said pair of abutment members and said second component abutment member thereby forming first and second sets of mutually opposing surfaces; and positioning first and second toroidally shaped, flexible, substantially inelastic members in contact only with said first and said second sets of mutually opposing surfaces respectively so that only forces in an axial direction are transmitted between said first and said second annular aircraft components.

6. The method of claim 5 wherein said first and second toroidally shaped members are hollow and filled with a fluid.

7. The method of claim 6 wherein said fluid is a compressible fluid.

8. The method of claim 6 wherein said fluid is an incompressible fluid.

* * * * *